United States Patent [19]

Brooks et al.

[11] 4,338,988
[45] Jul. 13, 1982

[54] AUTOMATIC TIRE CHAINS

[76] Inventors: Ralph J. Brooks, 186 S. Clearview Ave., Langhorne, Pa. 19047; George F. Mannices, 4123 Barnett St., Philadelphia, Pa. 19135

[21] Appl. No.: 240,208

[22] Filed: Mar. 3, 1981

[51] Int. Cl.³ .............................................. B60C 27/14
[52] U.S. Cl. ................................. 152/216; 152/213 R; 152/210; 180/16; 180/315; 280/757; 267/2; 267/110; 185/11; 185/40 H
[58] Field of Search ............... 152/213 R, 213 A, 214, 152/216, 222, 231, 233

[56] References Cited

U.S. PATENT DOCUMENTS

| | | | |
|---|---|---|---|
| 1,409,940 | 3/1922 | Forrest | 152/216 |
| 1,742,729 | 1/1930 | Robinson | 152/213 R |
| 1,786,229 | 12/1930 | Conrow | 152/216 |
| 2,456,438 | 12/1948 | Miller et al. | 152/214 |
| 2,968,330 | 1/1961 | Brown | 152/216 |
| 3,042,096 | 7/1962 | Buergel et al. | 152/216 |
| 3,079,973 | 3/1963 | Ziccardi | 152/216 |
| 3,111,974 | 11/1963 | Rice | 152/214 |

*Primary Examiner*—John E. Kittle
*Attorney, Agent, or Firm*—Martin Sachs

[57] ABSTRACT

An automatic tire chain for driver operated vehicles includes a chain device that is moved to the road contact surface of a tire from a position adjacent thereto by means of a spring mechanism placed under tension when the chain is held away from the road contact surface of the tire. A pair of rings, one being fixed to the wheel and the other being slideably mounted thereon are provided with indexing slots. The slideable ring has a chain affixed thereon and is moved relative to the fixed ring by an operator activated engaging mechanism mounted on the vehicle. The engaging means engages the indexing slots and moves the slideable ring relative to the fixed ring while the vehicle moves along the road at a speed less than 10 miles per hour placing the chain adjacent to the road contact surface of the tire. Upon activation of the engaging means by the operator of the vehicle a second time the engaging mechanism releases a locking device permitting the slideable ring to move by the force of spring tension to its first position pulling the chain from its adjacent position to the road contact surface of the tire.

22 Claims, 11 Drawing Figures

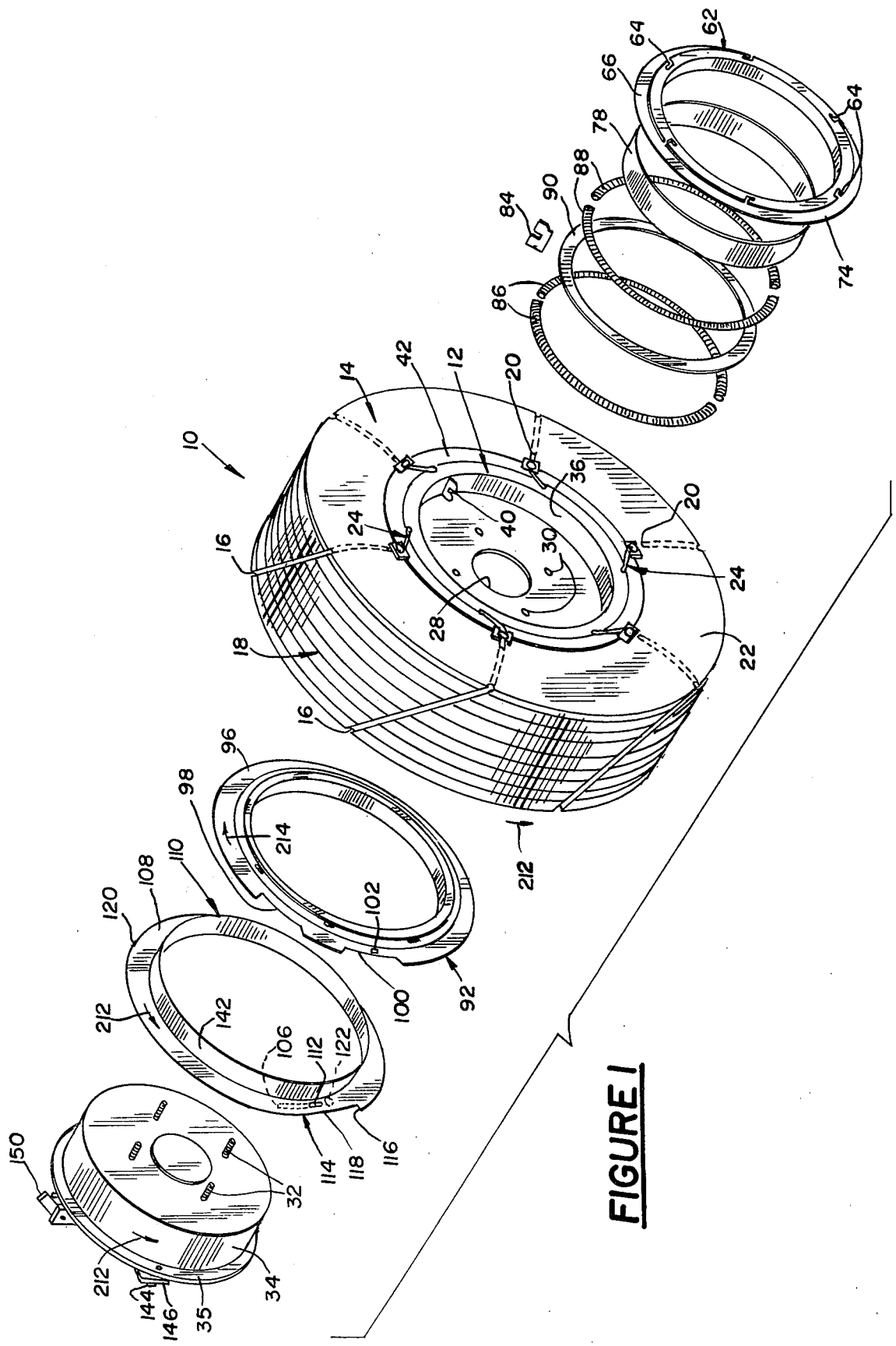

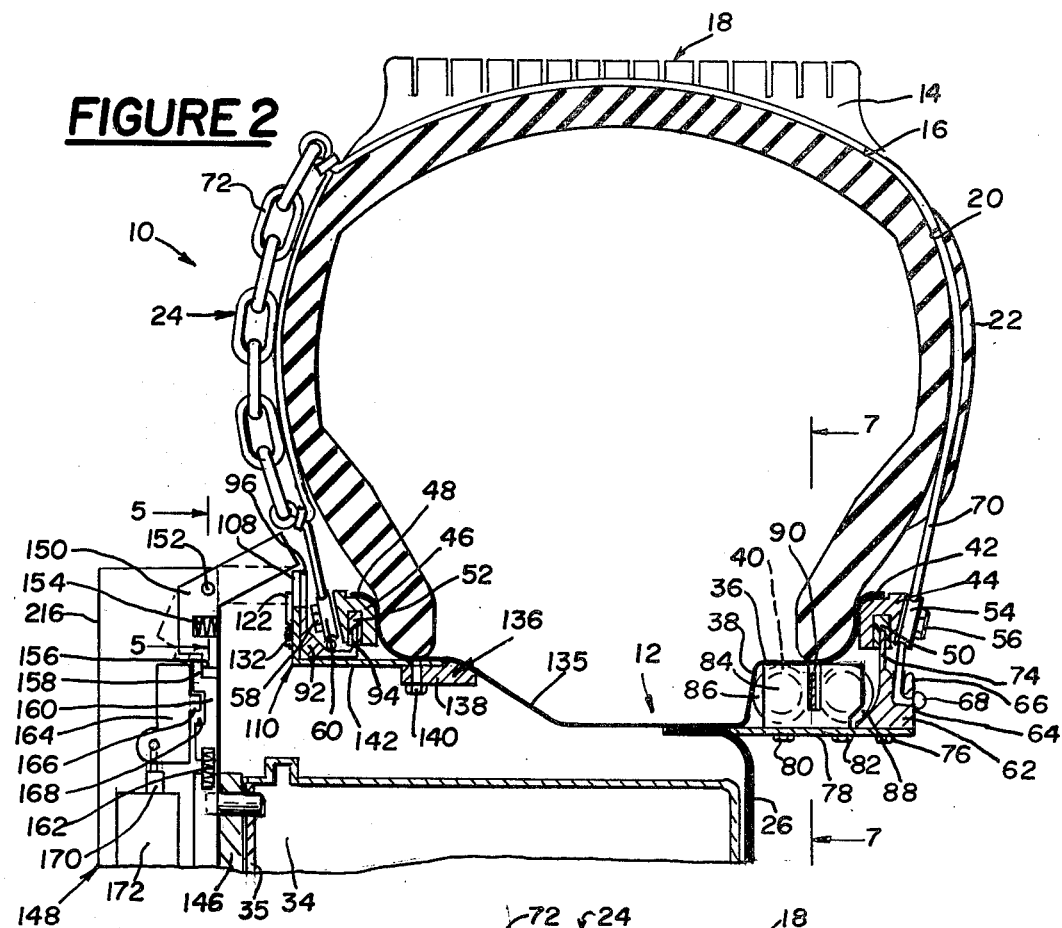
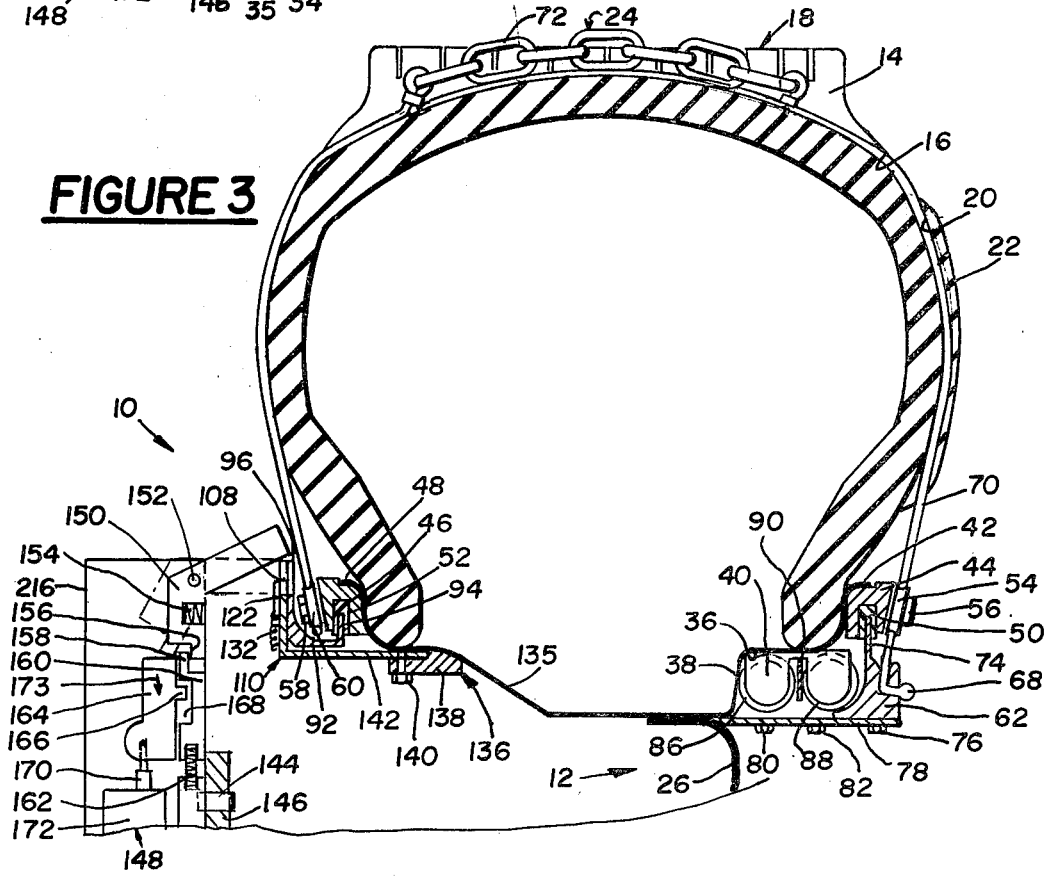

AUTOMATIC TIRE CHAINS

BACKGROUND OF THE INVENTION

1. Field of the Invention

The present invention relates to an automatic tire chain mechanism which moves the chains from a non-road contact position on a tire to the road contact position, and in particular, to an automatic tire chain which may be moved to its road contact position automatically by energy stored in a spring device.

2. Discussion of the Relevant Art

The art abounds with automatic chain devices and anti-skid devices for use on driver operated vehicles having a plurality of wheels with inflatable tires thereon. An anti-skid device is disclosed in U.S. Pat. No. 1,742,729 issued to J. A. Robinson on Jan. 7, 1930. The device disclosed therein utilized a chain physically mounted across grooves prepared in an automobile tire. The grooves are set at a predetermined depth, so that a chain having a thin portion and a thick portion can have the thin portion thereof concealed within the groove without contacting the road surface. By activation of the associated mechanism, the thin portion of the chain is used to pull the thicker chain into the grooves, thereby causing the chain to extend beyond the groove and come into contact with the road surface upon which the tire rests. The activation mechanism is relatively complicated and the chains are moved into the road contact position by a protruding member affixed to the chain which cooperates with a mechanism slideably mounted on the vehicle which extends outwardly and is adapted to cooperate with a protruding member.

Another retractable snow chain device is disclosed in U.S. Pat. No. 3,042,096 issued to G. K. Buergel et al on July 3, 1962. Therein is disclosed a system utilizing retractable snow chains. These chains in their retracted position are disposed within grooves provided on the tire. With the aid of a release mechanism mounted in the hub cap, the chain is released and by centrifugal force is permitted to rise above the groove and come into contact with the surface upon which the tire is rolling. A means for locking the chain in the road surface position is provided, as well as, means for activitating the release mechanism from the dashboard of the vehicle. The gearing mechanism required for proper operation is rather expensive and is mounted in the hub of the wheel.

Another automatic chain device is disclosed in U.S. Pat. No. 3,111,974 issued to C. M. Rice on Nov. 26, 1963. As disclosed therein, the tire chain is recessed in a groove provided in the tire tread. By activating a release mechanism mounted on the hub of the wheel, the chains are permitted to leave the groove and thus, come into contact with the surface of the tire. The activating mechanism includes a electrically controlled solenoid vacuum arrangement and gearing mounted in the hub of the wheel.

A further traction device is disclosed in U.S. Pat. No. 3,079,973 issued to J. J. Ziccardi on Mar. 5, 1963. As disclosed therein, the tire chains are disposed within the groove provided on the automobile tire. Activating a release mechanism permits the chain device by centrifugal force to pull out of the groove and move to the external surface of the tire so that it can come into contact with the road. Here again, the release mechanism is mounted in the hub of the wheel.

The instant invention overcomes the shortcomings found in the prior art by providing a simple inexpensive apparatus for moving a tire chain to the road contact surface of a tire from a position adjacent thereto with a minimum of components and without gearing required in the hub of the wheel.

SUMMARY OF THE INVENTION

Therefore, it is an object of the present invention to provide a traction device for driver operated vehicles which may be moved to the road contact surface without the operator leaving the automobile.

It is another object of the present invention to provide an automatic tire chain that remains under constant tension in its stored or activated position inorder to minimize interference with the roadability of the vehicle.

It is yet another object of the present invention to provide a simple automatic tire chain device which does not rely on the triggered gearing mechanisms to move the chain from its operating to non-operating positions.

It is yet another object of the present invention to provide an automatic tire chain for driver operated vehicles that is reliable and requires a minimum number of parts.

It is yet a further object of the present invention to provide an automatic tire chain for driver operated vehicles that can be moved into the road contact surface of the tire by utilizing energy previously stored in a spring device.

An automatic tire chain device for driver operated vehicles that can be moved to the road contact surface of the tire from a position adjacent thereto, according to the principles of the present invention, comprises in combination; a wheel including a tire disposed thereon, suitable for mounting on a vehicle. The wheel is provided with first and second rings disposed on the inwardly facing portion of the wheel. The first ring is rigidly affixed to the wheel and the second ring is slideably mounted on the wheel and nests within the rigidly affixed first ring. Both of the rings are provided with a parallely disposed lip portion. A third ring is slideably disposed on the outwardly facing surface of the wheel. The chains have one end retained on the inwardly facing slideable second ring with the other end thereof being retained on the outwardly facing slideable third ring and extends over the tire. The chains have a portion thereof provided with links which are disposed on the inwardly facing portion of the tire in a first position and disposed on the road contact surface of the tire in a second position. Springs are disposed on the third ring for biasing the chains and maintaining the chains in the second position. A device is disposed on the rigidly affixed first ring for locking the first and the second rings together in the first position. An engaging device is disposed on the vehicle and engages the inwardly facing second ring causing the second ring to move relative to the first ring as the wheel rotates moving the chains from the second position to the first position. The second ring is maintained in the first position by the locking device. Activating the engaging device again will cause the engaging device to release the locking mechanism and cause the spring to return the chains and the second and third rings to the second position.

The foregoing and other objects and advantages will appear from the description to follow. In the description reference is made to the accompanying drawing which forms a part thereof, and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best definded by the appended claims.

BRIEF DESCRIPTION OF THE DRAWING

In order that the invention may be more fully understood, it will now be described, by way of example, with reference to the accompanying drawing in which:

FIG. 1 is an exploded view of the automatic tire chain and its associated mechanisms, according to the principles of the present invention;

FIG. 2 is a partial cross-sectional view in elevation taken through the wheel and tire showing the chain in its non-operating position;

FIG. 3 is a partial cross-sectional view in elevation of a wheel and tire showing the chain in its operating position;

DESCRIPTION OF THE PREFERRED EMBODIMENT

Figure 4:
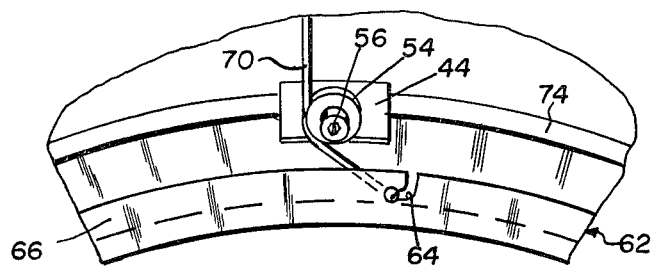
FIG. 4 is a partial view in perspective of the chain guide and retainer method used in the outwardly facing or third ring.

Referring now to the figures, and in particular, to FIG. 1, there is shown an exploded view of an automatic tire chain 10 according to the principles of the present invention which includes a wheel 12 having a tire 14 mounted thereon in a conventional manner. The tire 14 is provided with a plurality of channels 16 in the road contact surface 18 of the tire and a plurality of tubular shaped ducts 20 extending radially along the outwardly facing surface 22 of the tire 14. The tubular shaped ducts preferably are equally spaced around the surface 22 of the tire and communicate with the channels 16 provided therein, thereby providing a continuous path adapted to receive the tire chains 24 therein.

The wheel 12 includes a central portion 26 that is provided with a centrally disposed aperture 28 adapted to receive the end portion of the vehicle axel, not shown, and a plurality of smaller apertures 30 disposed about the periphery of aperture 28 which are adapted to receive the wheel bolts 32 normally found extending outwardly from the wheel brake drum on the vehicle. Nuts, not shown, are adapted to cooperate with the wheel bolts 32 and affix the wheel 12 to the vehicle in a conventional manner.

The inner surface 36 of the peripheral portion 38 of the wheel 12 has welded thereon at least two spring reactors 40 whose function will be explained hereinafter. The spring reactor 40 extends radially toward the axis of rotation of the wheel 12 and is on the outwardly facing surface of the wheel, once mounted, on the vehicle.

The outwardly extending lip portion 42 has welded thereon a plurality of bearing blocks 46 preferably equally spaced and disposed around the circumference of the outwardly extending lip portion 42 (see FIG. 2). An equal number of bearing blocks 46 are welded to the inwardly extending lip portion 48, of peripheral portion 38 of wheel 12. The number of bearing blocks utilized on the inwardly extending lip portion 48 and outwardly extending lip portion 42 depends upon the number of tire chains to be mounted on the wheel 12 and the function of the bearing blocks will be more fully explained hereinafter.

Nested in the bearing blocks 44 and 46 are slotted bearings 50, and 52, prereferably made of teflon. Additionally included in the outwardly facing surface of bearing block 44 is a rotating guide pulley 54 journaled about a bolt 56 retained in the bearing block 44.

In a similar manner, bolt 58 permits the rotation of guide pulley 60 in bearing block 46.

Figure 7:
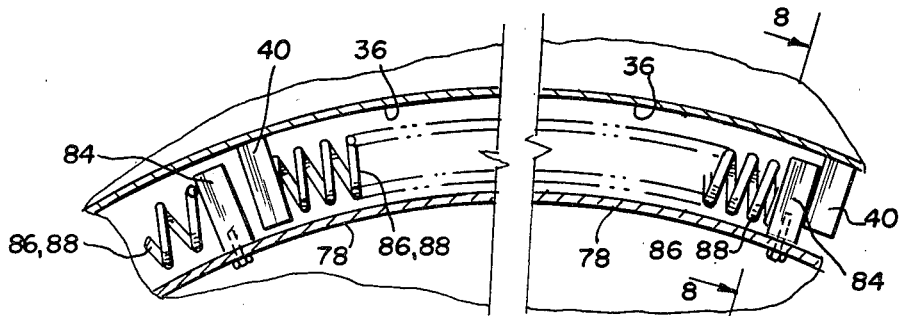
FIG. 7 is a partial cross-sectional view taken along the line of 7—7 in FIG. 2.

A reeling ring 62 is provided with a plurality of keyhole or L-shaped apertures 64 equally spaced around the periphery of the lip portion 66 of the reeling ring 62. Each of the keyhole apertures 64 are adapted to cooperate with and removably retain therein the enlarged end 68 of the narrow or cable portion 70 of a chain 24 which has a plurality of links 72 affixed therein, as shown in FIGS. 2 and 3. The inward lip portion 74 of reeling ring 62 extends outwardly further than lip portion 66 and is adapted to cooperate with and be received by the slotted bearing 50 mounted on the outwardly extending lip portion 42 of the wheel 12. Reeling ring 62 is freely journaled in the slotted bearing 50 and may be caused to move by pulling on the narrow portion 70 of chain 24, as will be explained hereinafter. The lower portion of reeling ring 62 has affixed thereon, by a plurality of bolts 76, a spring cover ring 78 in a conventional manner. Spring cover ring 78 extends inwardly from the reeling ring 62 and almost contacts the central portion 26 of the wheel 12, thereby providing a generally dirt free chamber encompassed by the inner surface 36 of peripheral portion 38, lip portion 74 of reeling ring 62 and spring covering 78. Perferably, at least two spring reactors 40 are welded to the inner surface 36 of the peripheral portion 38 of wheel 12 and two spring retainers are affixed to the spring cover ring 78 as shown in FIG. 7.

Figure 8:
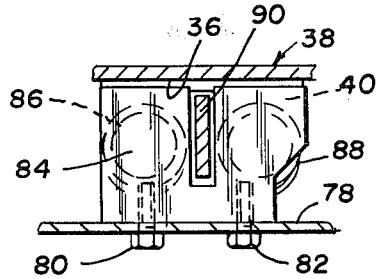
FIG. 8 is a partial view in elevation taken along the line 8—8 in FIG. 7.
Figure 6:
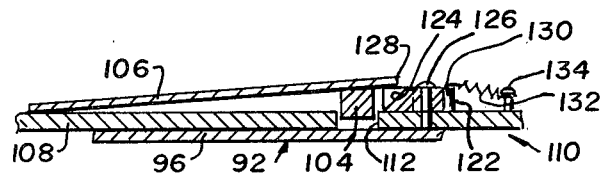
FIG. 6 is a partial view in elevation taken along the line 6—6 in FIG. 5.

Nested between the spring reactor 40 and the spring retainer 84 are a pair of coil springs 86 and 88 (see FIGS. 7 and 8) maintaining a spring pressure therebetween of preferably, 230 lbs., when the chain is in its non-operating position on the inwardly facing surface of the tire and is at a pressure of 150 lbs., when the chain 24 is in its operating position on the contact surface 18 of the tire 14. Preferably, two coils springs 86 and 88 are utilized to exert pressure on a spring retainer 84 and a spring reactor 40, thereby requiring a total of four springs for proper operation. A spring separated ring 90 is disposed between springs 86 and 88 to maintain them apart and reduce the possibility of unwanted interaction therebetween. The method of obtaining and varying the spring pressure will be disclosed hereinafter in conjunction with the method of operation of the automatic tire chains.

Figure 5:
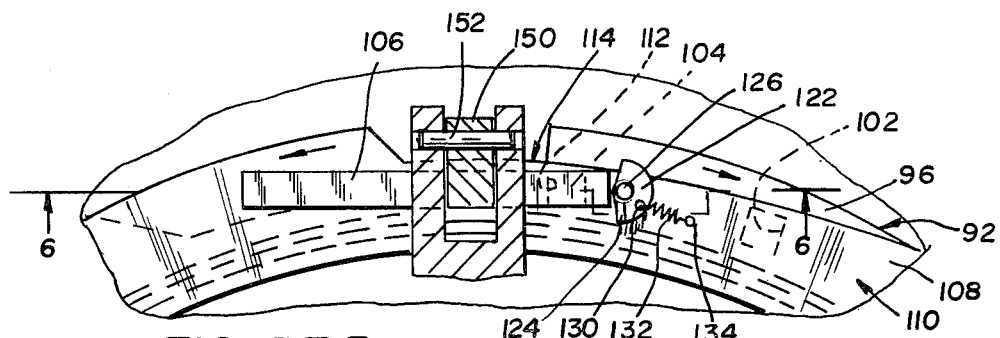
FIG. 5 is a partial view, partially in cross-section taken through line 5—5 in FIG. 2.
Figure 10:
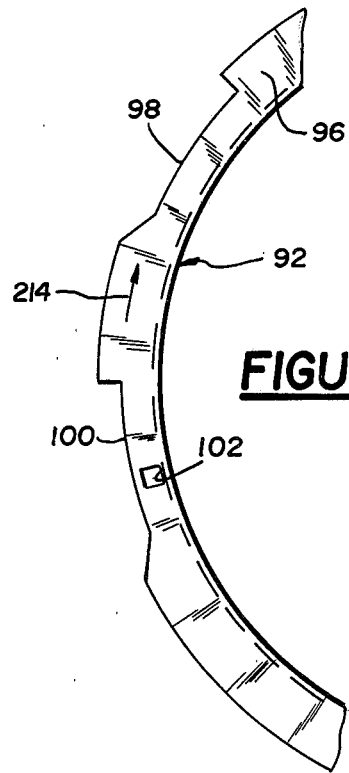

Slideably retained within bearing blocks 46 is a generally U-shaped disengage ring 92 which has a lip portion 94 in intimate contact with the teflon slotted bearing 52 retained within bearing block 46. The remaining lip portion 96 of disengage ring 92 is provided with a pair of notches 98 and 100 in the circumference (as shown in FIG. 10) and an aperture 102 in the lip portion 96 directly below notch 100. The aperture 102 is adapted to receive the protruding portion 104 of locking lever 106 which is spot welded to the lip portion 108 of latch release cam ring 110 (as shown in FIG. 5). Latch release cam ring 110 is provided with an aperture 112 through which the protruding portion 104 of locking lever 106 may extend and when aperture 102 of lip portion 96 of ring 92 comes into alignment therewith will lock ring 92 and ring 110 together, as will be explained hereinafter.

Figure 9:
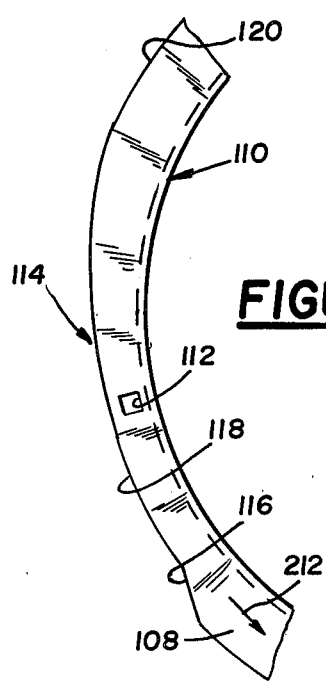
FIGS. 9 and 10 are partial views of the lip portion of the two inwardly facing rings.

Latch release cam ring 110 is provided with a cam-shaped cut out 114 disposed above aperture 112. Cam-shaped cut out 114 which is in the circumference of a lip portion 108 of ring 110 is provided with a shoulder portion 116 and a curved portion 118 which extends from the lower portion of the shoulder and gradually rises to the outer periphery 120 of the lip portion 108. (See FIG. 9).

A locking release cam 122 is pivotally mounted on the lip portion 108 of latch release cam ring 110 proximate the protruding portion 104 of latching lever 106. Cam 122 is provided with a knife edge sloped portion 124 which, when rotated about its pivot point provided by shaft 126, will move beneath the free end 128 of locking lever 106 raising the protruding portion 104 in aperture 112 so that it will not extend therethrough and come into contact with aperture 102 provided in the lip portion 96 of disengage ring 92. Cam 122 is also provided with a spring retainer hole 130 which retains one end of spring 132 thereon. The other end of spring 132 is affixed by retainer screw 134 to the lip portion 108 of latch release cam ring 110. Since spring retainer hole 130 is eccentrically positioned on cam 122 spring 132 maintains cam 122 in a normally unlocked position (out of contact with the end portion 128 of lever 106) until caused to be rotated, which will be explained hereinafter.

Latch cam ring 110 is affixed to the inwardly facing surface 134 of the peripheral portion 38 of wheel 12 by means of bearing blocks 136 positioned around the inwardly facing periphery of the wheel 12 as shown in FIGS. 2 and 3. Block 136 is provided with an overhanging lip portion 138 which is tapped, in a conventional manner, to receive bolts 140 therein. The overhanging lip portion 138 of blocks 136 are designed to encompass the lower portion 142 of latch release cam ring 110. Thus, by tightening down bolts 140 cam ring 110 may be retained in position on the wheel 12.

Referring once again to FIGS. 1, 2 and 3, the auto wheel dust covers 35 are preferably drilled on their most extreme diameter to receive two dowels 144 (only one shown) and the bolts that normally hold the wheel cylinders in place, not shown, will be extended to accomodate a mounting bar 146 that has an engaging device 148 affixed on one end thereof, in a conventional manner. The engaging device 148 extends beyond the periphery of dust cover 144 and is provided with a generally L-shaped lock bar 150 which pivots about shaft 152 (see FIG. 5) and is urged in an outwardly extending generally horizontal direction by means of a spring 154. In its outwardly extending horizontal position lock bar 150 is designed to contact the lip portions 96 and 108 of disengage ring 92 and latch release ring 110, respectively. In its steady state operating condition spring 154 is compressed positioning lock bar 150 in an upwardly direction so that it is out of contact with the lip portions 96 and 108. The rear portion of lock bar 150 is provided with a sloped ledge 156 that is designed to cooperate with and engage an overhanging lip portion 158 of a retainer block 160 which is slideably mounted proximate thereto. Retainer block 160 is urged by a spring 162 in a direction to normally engage the sloped ledge 156 of lock bar 150, thereby maintaining lock bar 150 in its upwardly position.

A release block 164 is provided with an extending portion 166 adapted to cooperate with a recessed portion 168 provided in retainer block 160 and by contact therewith is capable of urging retainer block 160 from a first position which contacts the sloped ledge 156 of lock bar 150 to a second position which permits lock bar 150 to move to its outwardly extending horizontal position caused by the urging of spring 154.

Release block 164 is connected in a suitable manner to the movable shaft or core 170 of an electrically operated solenoid 172 which, when energized, will move release block 164 in the direction of arrow 174 causing retainer block 160 to release lock bar 150.

Figure 11:
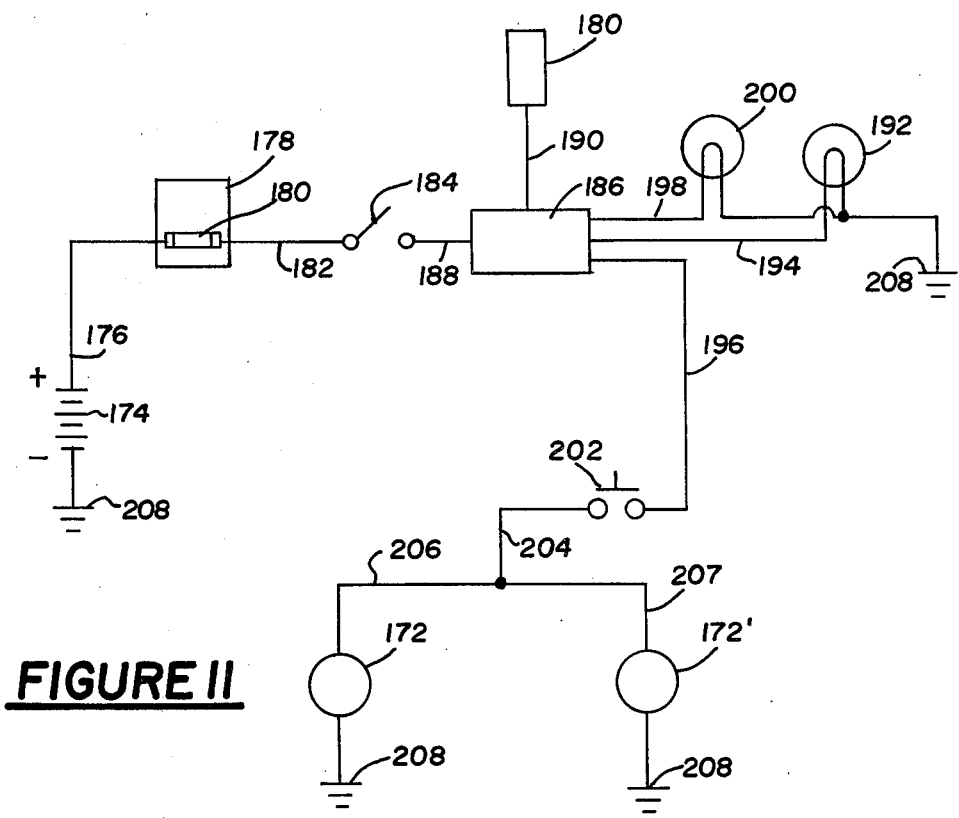
FIG. 11 is a schematic circuit diagram of the operational control system for the automatic tire chain.

Refer now to FIG. 11, which is a typical wiring diagram for the automatic tire chain according to the principles of the present invention. The vehicle battery 174 is to be connected, via a wire or lead 176 to a fuse block 178 having a fuse 180 affixed thereon, in a conventional manner. The fuse block 178 may be part of the conventional vehicle wiring system and fuse 180 may be the auxiliary position normally provided for additional equipment selected by the vehicle purchaser. Fuse 180 is connected via wire 182 to an on-off switch 184 preferably mounted on the dash board of a convenient place for activation by the operator of the vehicle. The other end of switch 184 is connected to a logic control monitor 186 by means of a wire 188. The logic control monitor is a conventional circuit arrangement which receives electrical signals from a speed sensor 188, via a wire 190 and only permits the battery voltage appearing on lead 188 to be connected to the on-light indicator 192, which preferably is green, via wire 194 only when the vehicle is moving at a speed less than 10 miles per hour. When indicator light 192 is illuminated the battery voltage will also appear on lead or wire 196. If the vehicle speed is in excess of 10 miles per hour the voltage control monitor will prevent the battery voltage from appearing on leads 196 and 194, but will put the battery voltage on lead 198, thereby illuminating indicator 200, preferably red, telling the vehicle operator that the system is in the off condition and the chains cannot be moved to their road contact position. When the vehicle speed is reduced to 10 miles per hour or less, activation of switch 202 will couple the battery voltage, via wires 204, 206 and 207, to one end of the solenoids 172 and 172', thereby energizing them and causing the release block to be activated on each of the wheels upon which the automatic chain device has been mounted. To complete the electrical circuit path one side of the battery is connected to ground reference 208 which is generally the vehicle frame and engine which are maintained at the common reference for all the electrical systems installed in the vehicle. The other side of indicators 192 and 200 are also connected to ground reference 208 as are the other ends of solenoids 172 and 172' to complete the electrical current path from the plus side of the battery to the negative side of the battery which generally is 12 volts DC. The present system may also be adapted to operate with vehicles having a 6 volt battery system by merely changing the type of indicating lights used and the type of solenoids utilized.

In operation, lock bar 150 is in its upward or raised position as shown in the solid lines in FIGS. 2 and 3 and out of contact with the lip portions 96 and 108 of the rings 92 and 110, respectively, with the lip portion 158 and retainer block 160 maintaining lock bar 150 in position against the urging of spring 154. The U-shaped disengaging ring 92 and the latch release cam ring 110 is locked together by virtue of the protruding protion of locking lever 106 extending through aperture 112 and into aperture 102. Locking release cam 122 is in the position as shown in FIG. 5. Springs 86 and 88 (two pairs) are under a pressure of at least 230 lbs., and chains 24 is located as shown in FIG. 2 on the inwardly facing side of the tire 14. When the vehicle operator desires to have the chains 24 moved into the road contact position he activates or closes switch 84. If the vehicle speed is 10 miles per hour or less, indicator light 192 will be illuminated permitting him to energize the solenoid 172 by closing switch 202. Activation of solenoid 172 will cause release block 164 to move in the direction of arrow 173, thereby releasing lock bar 150 from its retained position and permits it to move to its normally extended position (second position) wherein it falls into notch 114 and notch 100 rings 110 and 92, respectively. As the wheel 12 rotates together with the wheel drum 34 in the direction of arrow 212 (see FIG. 1) lock bar 150 comes into contact with locking release cam 122, thereby causing it to rotate with its sloped portion 124 moving beneath the free end 128 of locking lever 106, thereby removing the protruding portion thereof from engaging ring 92. With springs 86 and 88 exerting pressure between the spring reactors 40 and spring retainers 84, disengage ring 92 will be urged in the direction of arrow 214 moving a distance of approximately 7 inches until the spring retainer 84 comes into contact and is stopped by spring reactors 40. The movement of ring 92 which has chain 24 affixed thereto causes the chain 24 to be moved to its position adjacent to the road contact surface of the tire to its contact surface as shown in FIGS. 2 and 3, thus, providing extra traction for the vehicle. The continual rotation of the wheel 12 will cause the curved portion 119 of slot 114 to gradually raise the lock bar 150 to its upwardly position, thereby enabling retainer block 160 to be urged into contact with lock bar 150 by spring 162.

If the vehicle operator decides to remove the chain from the road contact surface of the tire, the same procedure is repeated. Upon closing of switch 202 and activating solenoid 172 again, lock bar 150 is released and permitted to move to its horizontal position wherein it comes into contact with the lip portions 96 and 108 of rings 92 and 110, respectively. As the wheel continues to rotate in the direction of arrow 212 disengage ring 92 is urged in the direction of arrow 214, thus further compressing the spring and causing the chain 24 to move from its road contact position to its position adjacent thereto on the inwardly facing side of tire 14.

Preferably, a housing or cover 216 encloses the components and the engaging device 148 in order to prevent them from becoming inoperable due to dust or moisture accumulating thereon. Although the preferred embodiment of the instant invention utilizes a logic control monitor 186 and a speed sensor 180, it is possible to operate the disclosed device without these components merely relying on the length and depth of the notches provided in rings 92 and 110 to be of the proper size to receive lock bar 150 therein at the desired speed of operation. If the slots are not sufficiently wide to receive the lock bar therein within the time required for the lock bar's changing of position from its upward position to its normally horizontal position the lock bar will be moved back out of position and, therefore, would have to be reactivated and the vehicle slowed down so that sufficient time was made available for the lock bar to be received into the notches provided on the disengage ring and the latch release ring.

Hereinbefore has been disclosed a reliable automatic tire chain for driver operated vehicles that contains a minimum of components and may be activated by a vehicle operator without exiting from the vehicle. It will be understood that various changes in the details, materials, arrangement of parts and operating conditions which have been herein described and illustrated in order to explain the nature of the invention may be made by those skilled in the art within the principles and scope of the present invention.

Having thus set forth the nature of the invention, what is claimed is:

1. An automatic tire chain for driver operated vehicles that can be moved to the road contact surface of a tire from a position adjacent thereto comprising, in combination:
  (a) a wheel, including said tire disposed thereon, suitable for mounting on said vehicle, said wheel being provided with;
    (i) first and second rings disposed on the inwardly facing portion of said wheel, said first ring being rigidly affixed to said wheel, said second ring being slidably mounted on said wheel and nested within said rigidly affixed first ring, both said rings being provided with a parallelly disposed lip portion,
    (ii) a third ring slidably disposed on the outwardly facing portion of said wheel,
    (iii) chain means having one end thereof retained on said inwardly facing slidable second ring, the other end thereof being retained on said outwardly facing slidable third ring and extending over said tire, said chain means having a portion thereof provided with links, said link portion being disposed on the inwardly facing portion of said tire in a first position and being disposed on the road contact surface of said tire in a second position,
    (iiii) spring means disposed on said third ring for biasing said chain means and maintaining said chain in said second position, and
    (iiiii) means disposed on said rigidly affixed first ring for locking said first and said second rings together in said first position; and
  (b) means disposed on said vehicle for engaging said inwardly facing second ring causing said second ring to move relative to said first ring as said wheel rotates moving said chain means from said second position to said first position, said second ring being maintained in said first position by said locking means activating said engaging means again will cause said engaging means to release said locking means and cause said spring means to return said chain means and said second and third rings to said second position.

2. An automatic tire chain according to claim 1 wherein said tire is provided with a channel disposed in said contact surface for each of said chain means to be moved therein.

3. An automatic tire chain according to claim 2 wherein said channel means extends transversely across said tire contact surface at an angle to the axis of rotation of said tire.

4. An automatic tire chain according to claim 2 wherein six chains means and six channel means are provided.

5. An automatic tire chain according to claim 1 wherein said wheel is provided with a plurality of bearing means disposed proximate the perimeter of the inner facing surface for cooperating with the lip portion of said second ring and for permitting rotational movement therebetween.

6. An automatic tire chain according to claim 5 wherein said bearing means engages and cooperates with said lip portion provided on said second ring.

7. An automatic tire chain according to claim 1 wherein said second ring is provided with at least two notched portions in the circumference and an aperture in said parallel lip portion for cooperating with said engaging means and said locking means, respectively.

8. An automatic tire chain according to claim 1 wherein said first ring is provided with at least one notched portion in the circumference and an aperture in said parallel lip portion, said notched portion cooperating with said engaging means and being shaped to return said engaging means to a disengage position as said wheel rotates, said aperture cooperating with said locking means and said second ring aperture.

9. An automatic tire chain according to claim 1 wherein said first ring is provided with a spring means disposed on said parallel lip portion having an inwardly extending portion, said inwardly extending portion extending through an aperture provided in said parallel lip portion and adapted to cooperate with an aperture provided in the parallel lip portion of said second ring for locking said first and second rings together.

10. An automatic tire chain according to claim 9 wherein said first ring further includes releasing means disposed on said parallel lip portion proximate said inwardly extending portion, said releasing means being caused to remove said inwardly extending portion from said second ring aperture upon rotation of said wheel when contacting said engaging means.

11. An automatic tire chain according to claim 1 wherein said wheel is provided with a plurality of bearing means disposed proximate the perimeter of the outer facing surface for cooperating with a portion of said third ring and for permitting rotational movement therebetween.

12. An automatic tire chain according to claim 11 wherein said bearing means engages and cooperates with a lip provided on said third ring.

13. An automatic tire chain according to claim 5 or 11 wherein said bearing means further includes guide means for said chain means.

14. An automatic tire chain according to claim 5 or 11 wherein said guide means includes a rotating member to enable said chain means to move freely.

15. An automatic tire chain according to claim 1 wherein said engaging means is electrically operated.

16. An automatic tire chain according to claim 1 wherein said engaging means includes:
 (a) an engaging bar disposed on said vehicle proximate said parallel lip portions of said first and second rings and rotatable to a first position which is in contact with said lip portions and to a second position which is out of contact with said lip portions,
 (b) first spring means for urging said engaging bar towards said first position,
 (c) a retainer block disposed proximate one end of said engaging bar and adapted to cooperate therewith for retaining said engaging bar in its second position once said engaging bar is placed in said second position by rotation of said first ring,
 (d) second spring means for urging said retainer block towards said engaging bar for cooperation therewith,
 (e) a release block disposed proximate said retainer block for momentarily urging said retainer block in a direction opposite to said second spring releasing said engaging bar, and
 (f) a solenoid connected to said release block, said solenoid causing the momentary movement of said release block when energized.

17. An automatic tire chain according to claim 16 further including means for energizing said solenoid disposed remotely therefrom and proximate said driver of said vehicle.

18. An automatic tire chain according to claim 1 wherein said combination further includes a sensor means for sensing the speed of said vehicle, said sensing means preventing the activation of said engaging means when said vehicle exceeds a predetermined speed.

19. An automatic tire chain according to claim 1 wherein said third ring further includes at least two spring retainer plates disposed thereon, said retainer plates being affixed perpendicular to said third ring and the outwardly facing surface of said wheel includes at least two spring reactor plates, said spring means being disposed therebetween exerting pressure thereon.

20. An automatic tire chain according to claim 19 further including circular cover means affixed to said third ring and extending towards said wheel for excluding foreign matter from entering into and interfering with said spring means.

21. An automatic tire chain according to claim 19 further including spacer means disposed between said spring means for keeping them in position.

22. A system for automatically moving a tire chain to the road contact surface of a tire from a position adjacent thereto comprising:
 (a) means for mounting a tire chain to the inwardly facing surface of said tire;
 (b) spring means for drawing said tire chain from the inwardly facing surface of said tire to said road contact tire surface;
 (c) activation means for releasing the energy stored in said spring means for enabling said spring means to move said chains; and
 (d) means for restoring said chain to its original position on the inwardly facing surface of said tire.

* * * * *